United States Patent

[11] 3,581,256

[72] Inventor Charles Vazquez, Paris, France
[21] Appl. No. 809,270
[22] Filed Mar. 21, 1969
[45] Patented May 25, 1971
[73] Assignee International Standard Electric Corporation, New York, N.Y.
[32] Priority Mar. 28, 1968
[33] France
[31] 145,857

[54] SHOCK RESISTANT ARMATURE FOR ELECTROMAGNETIC DEVICES
5 Claims, 5 Drawing Figs.
[52] U.S. Cl. .................................... 335/271, 335/277
[51] Int. Cl. .................................... H01f 7/08
[50] Field of Search .......................... 335/257, 264, 276, 279, 271, 277

[56] References Cited
UNITED STATES PATENTS
| | | | |
|---|---|---|---|
| 2,881,367 | 4/1959 | Watson | 335/264X |
| 3,148,313 | 9/1964 | Hancock | 335/271X |
| 3,389,354 | 6/1968 | Aaberg | 335/277X |

Primary Examiner—G. Harris
Attorneys—J. Warren Whitesel, C. Cornell Remsen, Jr., Walter J. Baum, Percy P. Lantzy, Delbert P. Warner and James B. Raden ABSTRACT: Structure for damping the vibrations in armatures of electromagnets. The shock of operating pieces in electromechanical devices is reduced by making the armature out of several parts. These parts are juxtaposed, but they are not rigidly associated with each other. Each part vibrates at a frequency proper to it. This arrangement enables a great damping of the overall vibration resulting from shocks.

PRIOR ART

SHOCK RESISTANT ARMATURE FOR ELECTROMAGNETIC DEVICES

The present invention relates to improvements in armatures for relays, electromagnets, and similar devices.

For some time past, the trend has been to reduce the dimensions of elements used in telecommunication systems. This evolution is particularly noticeable in electronic field, but it also spreads to equipment provided with electromechanical units.

The miniaturization of electromechanical apparatus has led to new problems. Due to their reduced dimensions, the mobile parts of electromechanical apparatus have a mass and inertia which is less than the mass and inertial of the corresponding parts of previous apparatus, which makes it possible to operate them at higher speeds. When these mobile parts reach the end of their travel, they are subjected to a deceleration which often results in a mechanical shock against a stationary part. This shock creates vibrations, but, when these parts have normal dimensions, there is a significant amount of damping at the natural and resonant vibration frequencies due to molecular working and the relatively great number of material molecules which are present. However, when the parts are reduced in size, there is less significant molecular damping; thus, the vibration frequencies become less complex and molecular oscillations tend to occur. These oscillations may cause the material to break.

The object of the present invention is to achieve shock resistant operating pieces having miniaturized dimensions and a high speed operation while avoiding the above-mentioned drawbacks.

According to one feature of the invention, operating pieces of electromagnetic devices which are subject to shock are made of several parts. These parts are supported adjacent each other along their greatest surfaces, but they are not rigidly associated. Such an arrangement enables a significant damping of the spurious oscillations resulting from the shocks and a lowering of the resultant vibration frequency of all said parts. Each part vibrates a natural resonant frequency proper to it, and the resultant frequency corresponding to the beat frequency between the vibration frequencies of the parts.

According to another feature of the invention, the parts which constitute the pieces have all the same thickness.

According to an alternative feature, the parts which constitute the pieceparts of the armature may be of any thickness, as compared the thickness of the other parts.

The above-mentioned and other features and objects of this invention and the manner of obtaining them will become more apparent, and the invention itself will be best understood by reference to the following description of an embodiment of the invention taken in conjunction with the accompanying drawings, in which.

Figure 1:
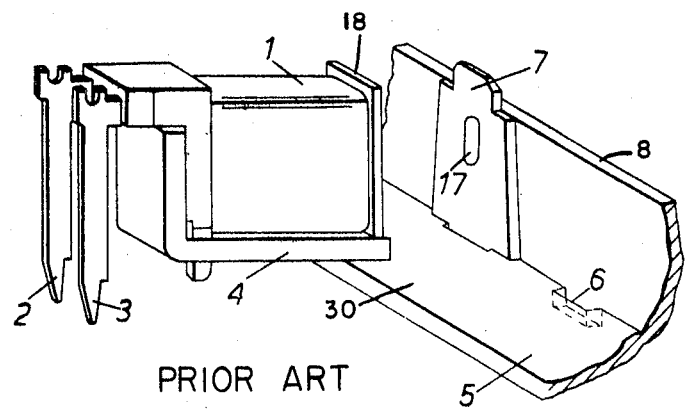
FIG. 1 is a schematic perspective view, partially exploded, of a well-known electromechanical system.

FIG. 1 provides an example which may use the principle of the invention. Here, an electromagnet coil is fed through solder terminals 2 and 3, mounted on the yoke 4, connected to appropriate circuits (not represented in the figure). The armature support 5 includes openings, such as 6, provided for housing other parts corresponding to the armatures 7. The armature yoke 4 may be affixed to the support 5 by suitable screw and tapped hole mounting (not shown) as is well known in the prior art to align the bobbin 18 parallel to stationary flange 8. As is further well known in the art, suitable restoring springs (not shown) may be affixed to end or lug part 9 of the armature and to a suitable stationary member of the yoke 4. While such structure has not been shown, it is clearly within the purview of one skilled in the art given the principles shown herein.

In the rest position, the armature leans against the flange 8 of the support. When a sufficient current flows through the coil 1, it attracts the armature 7 and pulls it against its core. The motion of the armature is a swing of its upper end about a pivot point at its lower part, i.e. it rocks about a knife edge in the opening 6. If, the dimensions of the electromagnet and its armature are reduced, and if the operating frequency is high, the armature is submitted to vibrations which can break it or the stud 17 generally associated to it.

Figure 2:
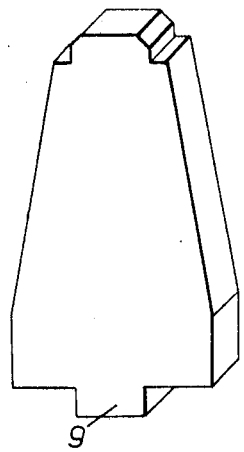
FIG. 2 is a large scale perspective view of the armature of FIG. 1.

The armature 7 of FIG. 1 is represented in a large scale view in FIG. 2. Specifically, the end or lug part 9 is received by and rocks in the opening 6 of support 5 (FIG. 1).

Figure 3:
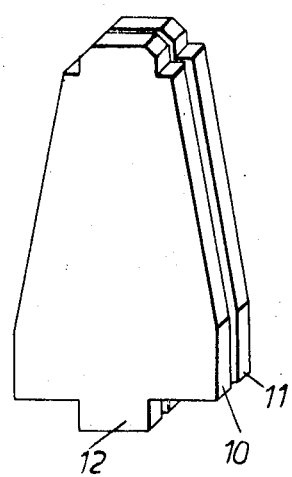
FIG. 3 is a large scale perspective view of the same armature, modified corresponding to the invention.

FIG. 3 shows an armature constructed according to the invention. Comparing this armature with that of FIG. 2, it can be seen that the profiles are identical. However, the inventive armature has two identical and adjacent parts 10 and 11, each of which has a thickness approximately equal to one-half the thickness of FIG. 2. In this way, the lugs 12 of both parts 10 and 11 can be fitted into the same openings 6 which are provided for the armatures 7 (FIG. 1). These parts are not rigidly associated with each other, but they are merely placed one against the other. This gives them a relative independence of motion. This arrangement makes it possible to obtain a damping of the vibrations generated by the parts of the armature.

In operation, the electromagnet coil attracts the armature, and each part individually swings about a pivot at its lug end 12. When the first part 10 strikes the coil core, the shock gives rise to vibrations which are transmitted at a given frequency through the molecules of the part. In its turn, the second part 11 comes to the end of its travel and strikes against the first one. Therefore, this second part also becomes a seat of molecular vibrations. However, the magnetic attraction exerted by the coil causes both parts to stick together so that, as each of them vibrates at its natural frequency, these frequencies combine, and finally, the whole armature vibrates at a beat frequency which is the resultant of the vibration frequencies of each individual part. This beat frequency is much lower than both component frequencies which makes it possible to avoid the drawbacks due to them. Especially, the armature parts 10, 11 will not break at the stud 12 responsive to the high frequency vibrations.

Moreover, such an armature as described in FIG. 3, is constituted by two or several parts. This facilitates manufacture since it is easier to cut a part having a thickness which is a half or a third of the normal armature final thickness.

In FIG. 3, the parts have the same thickness. However, this is not limitative, the parts could have different thicknesses without departing from the principle of the invention concerning the vibration damping. Similarly, it is not necessary for parts 10 and 11 be associated in any particular manner since they are held by their lugs 12 in openings 6 (FIG. 1). However, for relay armatures, for example, the parts should be held in their respective positions by an appropriate elastic means such as a clip which would ensure a nonrigid fixing for enabling the exchange of vibrations between both parts.

Figure 4:
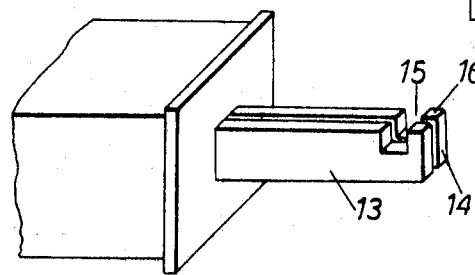
FIG. 4 is a large scale perspective view of a plunger for an electromagnet core which is made according to the invention.

This damping system is not only applicable to flat armatures but also to all similar pieces which are subject to shocks such as, for example, the mobile cores of plunger type electromagnets. In FIG. 4, the plunger is made from two adjacent pieces 13 and 14. The device upon which the plunger acts, engages the notches 15 so that the protrudings 16 transmit the strains and are submitted to the mechanical stress; therefore, they are the seat of vibrations which are damped similarly to the process above-described with FIG. 3.

Figure 5:
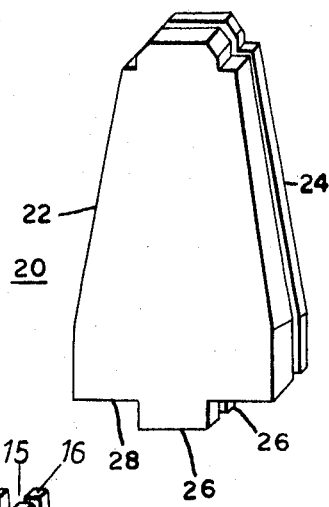
FIG. 5 is a large scale perspective view of an armature similar to that of FIG. 3 having parts of unequal thickness.

In FIG. 5, I show an armature 20, having parts 22 and 24 of unequal thickness, part 22 being approximately twice the thickness of part 24. In other proportions, the two parts are generally identical in configuration. As with the parts shown in the previously described figures, lugs 26 rest within cutout 6 with shoulders 28 resting on the surface shown as vertical surface 30 in FIG. 1. The opening 6 is sized to receive the lugs 26 and of course if considerably smaller in its lateral extent than the lateral extent of shoulders 28 to retain the armature.

The component parts of the plunger of FIG. 4 have a parallelepiped shape but it is obvious that this plunger could be cylindrical and made up of two half cylinders, the principle of dividing the piece submitted to the shocks into at least two parts being observed.

While the principles of the invention has been described in connection with specific apparatus and applications, it is to be understood that this description is made only by way of example and not as a limitation on the scope of the invention.

I claim:

1. An electromagnetic apparatus comprising means for producing a magnetic field, an armature member responsive to said magnetic field for movement under the effect thereof, said armature member comprising a plurality individual sections of substantially like surface configuration yieldingly mounted adjacent one another for common movement with respect to one another and vibratile at natural resonant frequencies on movement of said member to damp the shock vibration resulting from said movement.

2. An apparatus as claimed in claim 1, wherein said field producing means comprises a magnetic coil and said armature member comprises a plunger movable translatorily into and out of said coil, the combined widths of said sections forming said plunger.

3. An apparatus as claimed in claim 1, wherein there are means for mounting said armature member for pivotal movement toward and away from said field producing means, said mounting means loosely holding the sections of the armature member against one another adjacent one end of said armature member within a slot in said mounting means.

4. An apparatus as claimed in claim 1, wherein said sections are of equal thickness.

5. An apparatus as claimed in claim 1, wherein the thicknesses of said sections differ from one another.